Figure 1:
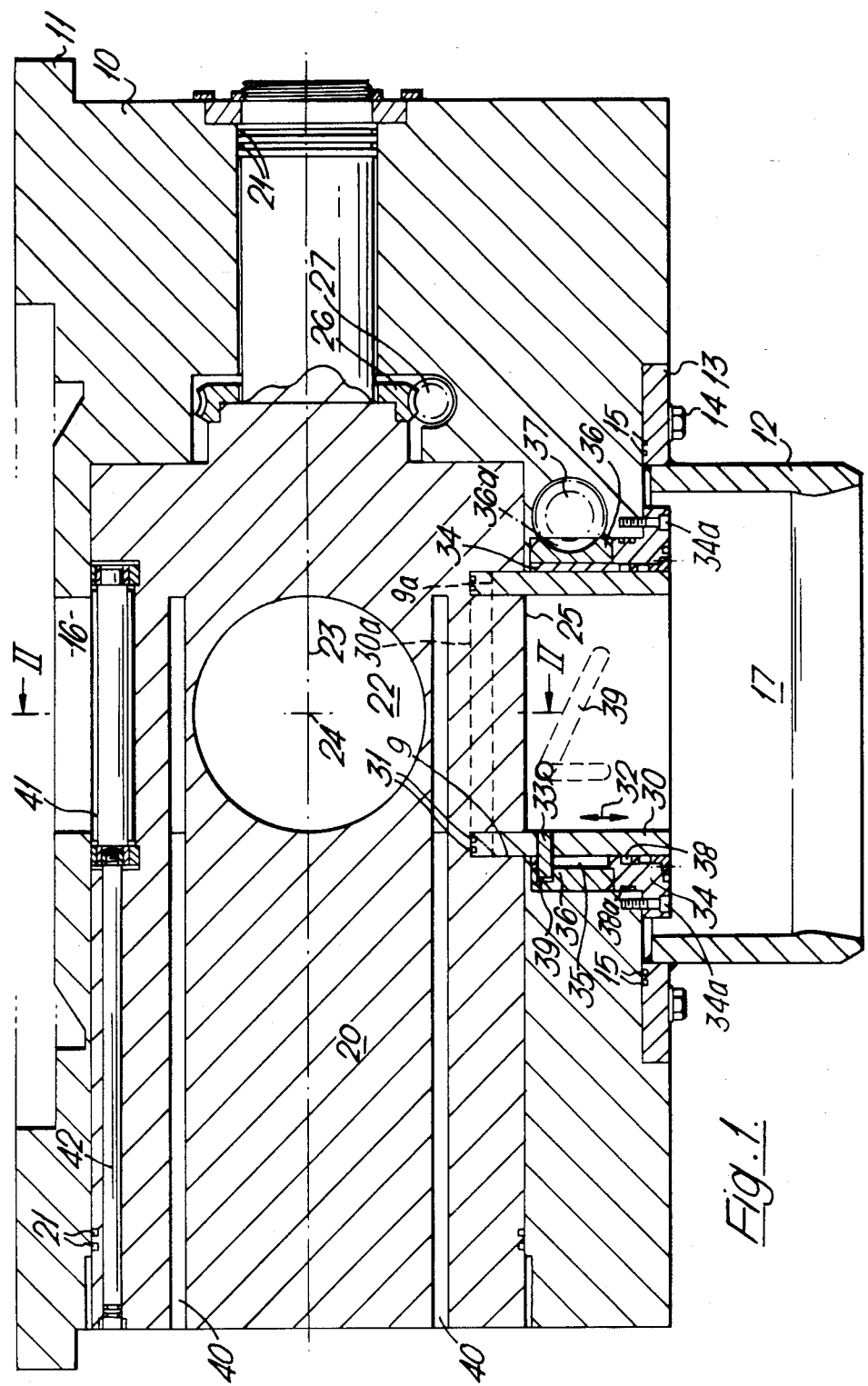

United States Patent [19]

Webb et al.

[11] Patent Number: 4,770,202

[45] Date of Patent: Sep. 13, 1988

[54] VALVES PROVIDING TRANSFER PORTS

[75] Inventors: John Webb, Bryn; David R. Parr, Warrington, both of England

[73] Assignee: Secretary of State for United Kingdom Atomic Energy Authority, London, England

[21] Appl. No.: 672,452

[22] Filed: Nov. 16, 1984

[30] Foreign Application Priority Data

Dec. 5, 1983 [GB] United Kingdom ............... 8332373

[51] Int. Cl.⁴ .................................................... F16K 3/26
[52] U.S. Cl. .................................... 137/242; 137/334; 251/159; 251/161; 251/163; 376/203; 376/268
[58] Field of Search ............... 137/242, 243.6, 243.7, 137/334, 341; 251/159, 161, 162, 163, 170, 188, 192, 89.5; 376/203, 268, 269

[56] References Cited

U.S. PATENT DOCUMENTS

| | | | |
|---|---|---|---|
| 3,220,694 | 11/1965 | Eschbaugh | 251/192 X |
| 3,261,483 | 7/1966 | Calabretta | 376/268 X |
| 3,269,691 | 8/1966 | Meima et al. | 251/159 |
| 3,350,055 | 10/1967 | Campbell et al. | 251/89.5 |
| 3,410,286 | 11/1968 | Satake | 137/341 X |
| 3,653,631 | 4/1972 | Hurst | 251/161 X |
| 3,765,439 | 10/1973 | Wise | 137/242 |
| 3,830,693 | 8/1974 | Beser et al. | 251/159 X |
| 4,366,946 | 1/1983 | Roark | 251/161 X |

FOREIGN PATENT DOCUMENTS

| | | |
|---|---|---|
| 1318686 | 1/1963 | France . |
| 600405 | 4/1948 | United Kingdom . |
| 724534 | 2/1955 | United Kingdom . |
| 725962 | 3/1955 | United Kingdom . |
| 729713 | 5/1955 | United Kingdom . |
| 962145 | 7/1964 | United Kingdom . |
| 987906 | 3/1965 | United Kingdom . |
| 1119731 | 7/1968 | United Kingdom . |

Primary Examiner—Gerald A. Michalsky
Attorney, Agent, or Firm—William R. Hinds

[57] ABSTRACT

A valve body 10 supports a rotary valve member 20 having a transfer port 22. Sealing between a port 17 of the valve and the member 20 is achieved by a sleeve 30 movable towards and away from the member 20. In a valve closed position seal means in a flat end of the sleeve engage a flat base of a recess in the member 20. The member 20 may be provided with a rotary scraper 41 and heaters located in channels 40 and in this construction the valve is suitable for transferring sodium-cooled nuclear fuel between various localities.

2 Claims, 2 Drawing Sheets

VALVES PROVIDING TRANSFER PORTS

This invention relates to valves providing transfer ports.

Valves are known, usually of a rotary spherical ball type, having a passageway through the rotary valve member of the valve along which articles can be passed so as to be transferred from one environment to another. For example, such valves exist in current nuclear reactor designs for the transfer of nuclear fuel from the environment of a nuclear reactor to that of a mobile shielded flask and subsequently from the flask to a storage facility. It is known in a spherical plug valve for a cam carried by the plug to cause a guide ring to move, on rotation of the plug, to press a seal against the surface of the plug. In the nuclear field, where access for maintenance can involve severe problems, a high standard of reliability is required, sealing of the valve member in the valve body has to be very secure, and operation should be uncomplicated. It is with these points in mind that the present invention is described.

According to one aspect of the invention a rotary plug valve comprises a rotatable plug of cylindrical form which has a recess in its outer surface providing a flat seat cooperable with seal means on a flat end of a sleeve in one position, and means for moving the sleeve to a retracted position clear of the plug.

The sleeve may have pegs engaging vertical slots in a fixed member and inclined slots in a member rotatable on the axis of the sleeve.

There may be seal means engaging around the outer surface of the sleeve.

There may be gearing in the valve body operable for moving the sleeve.

The inner surface of the sleeve may form a continuation of a transport port in the plug in the valve-open position.

The invention also includes a facility for transferring sodium-cooled nuclear fuel between localities including a transfer flask and a valve as defined above through which the fuel can be moved.

When a valve according to the invention is being used in the handling of nuclear reactor fuel which has been cooled by liquid metal, such as sodium, the valve member may be provided with heaters so that any solidified metal between the rotary valve member and the valve body can be melted quickly. It may also be provided with a scraper member so that, by rotating the valve member, any metal between body and member can be scraped away. The presence of such metal may arise from liquid metal dripping on to the valve member as metal soaked components are taken through the valve.

With the foregoing in mind, the invention provides a rotary plug valve comprising a housing, a plug of cylindrical form rotatable in the housing, a recess in the outer surface of the plug, the recess providing a flat seat, a sleeve having a flat end, seal means carried by the flat end, and means for moving the sleeve between a sealing position in which the seal means is in sealing engagement with the flat seat and a retracted position clear of the plug, the sleeve having pegs engaging vertical slots in a fixed member and inclined slots in a member rotatable on the axis of the sleeve.

The invention also provides a rotary plug valve comprising a housing, a plug of cylindrical form rotatable in the housing, a recess in the outer surface of the plug, the recess providing a flat seat, a sleeve having a flat end, seal means carried by the flat end, means for moving the sleeve toward and away from the plug between a sealing position in which the seal means is in sealing engagement with the flat seat and a retracted position clear of the plug, the sleeve in the sealing position preventing rotation of the plug, and a rotary scraper rotatably mounted in the rotary plug for rotation relative to the rotary plug for scraping the surface of the housing between inlet and outlet ports in the housing.

One form of valve in accordance with the invention will now be described with reference to the accompanying drawings in which:

FIG. 1 is a sectional side elevation; and

Figure 2:
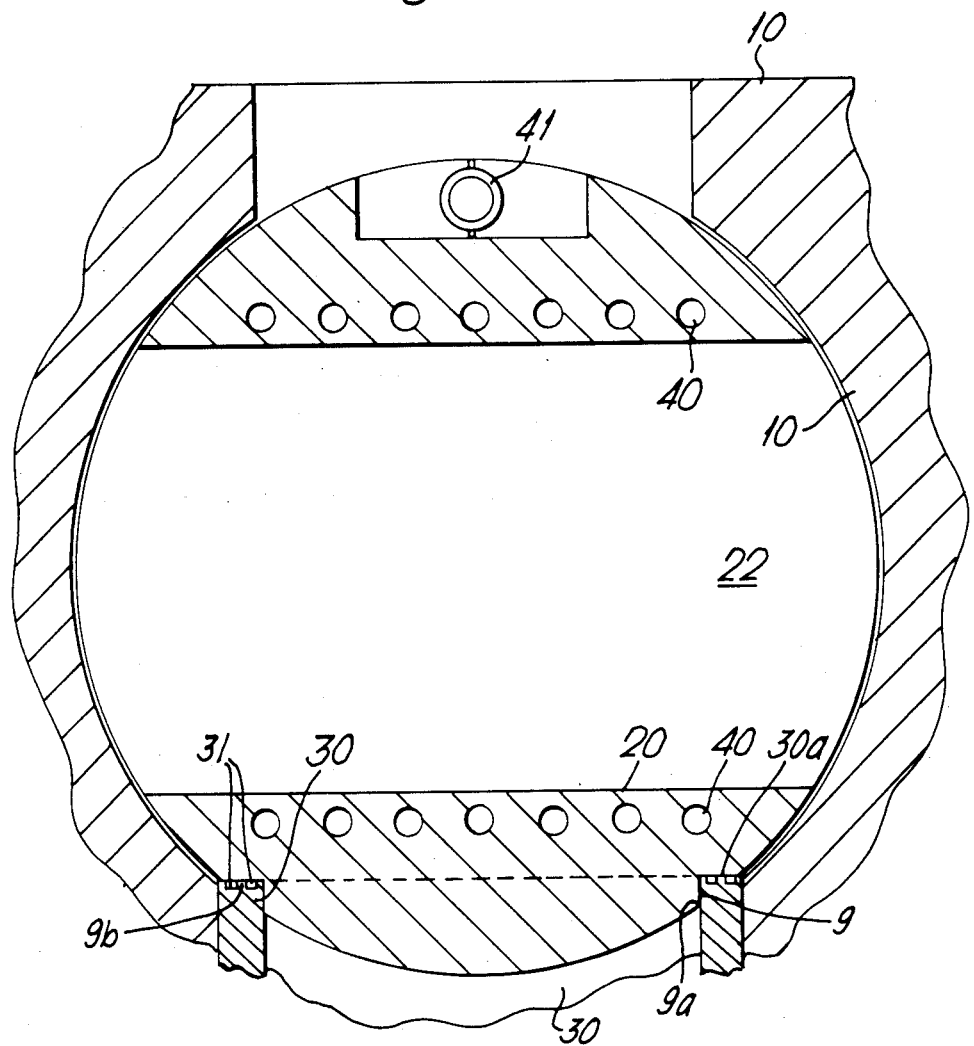

FIG. 2 a sectional end elevation of the rotary valve member of FIG. 1 on the line II—II of FIG. 1.

In FIG. 1 a valve has a valve body 10 with annular flange 11 for attachment to a component such as a shielded refuelling flask and a circular section nose sleeve 12 secured to the valve body at annular flange 13 by bolts 14. A double annular seal 15 is provided at the flange 13 between the flange 13 and the body 10.

Inside the valve body 10 there is a rotary valve member or plug 20 which is sealed to the body 10 at double annular end seals 21. The member 20 has a transfer port 22 which can be aligned (valve open position) with an upper port 16 and a lower port 17 in the valve body by appropriate rotation of the member 20. The member 20 is cylindrical in form and has side wall 25 and is rotatable on its longitudinal axis 23. The axis 24 of ports 16, 17 intersects axis 23 at right angles.

Sealing between the port 17 and the member 20 is derived, in the valve closed position (as shown in the drawings), from a circular section sealing sleeve 30 having two annular seals 31 in flat end face 30a of sleeve 30. The sleeve 30 is movable towards and away from sealing and locking engagement in member 20 as indicated by arrows 32. In the locked position the radially inner end of the sleeve 30 is received in annular recess 9 in the member 20. The recess 9 has a flat inner end surface 9b engageable by seals 31. When the valve is in the open position, that is the valve member 20 is rotated through 90° so that the port 22 is in line with ports 16 and 17, the sleeve 30 forms a continuation of the transfer port 22.

The sleeve 30 is moved in the direction of the arrows 32 by the action of pegs 33 secured to the sleeve 30 and engaging in inclined slots 39 in a rotary sleeve 36. Between the sleeve 36 and the sleeve 30 there is a fixed sleeve 34 having slots 35 (vertical as shown) with which the pegs 33 also engage. The sleeve 34 is held to body 10 by bolts 34a. The sleeve 36 is machined over a part of its external surface to define teeth 36a which are engaged by a worm 37 rotatable in the valve body 10. Double annular end seals 38 seal between sleeves 34 and 30 and annular seals 38a seal between sleeve 34 and the body 10.

The valve member 20 has a ring 26 of teeth secured to it and the teeth 26 engage a worm 27 also rotatable in the valve body 10. The valve member 20 has an array of channels 40 into which heaters can be inserted and a rotary scraper 4 driven by a shaft 42 in the valve member 20.

To operate the valve to open it, when it is connected typically at port 17 to a refuelling stub on a reactor and at port 16 to a shielded flask, the sealing sleeve 30 is lowered by rotating worm 37 to disengage from the member 20 and the rotary member 20 is rotated through 90° by rotating worm 27. The heaters in channels 40 will have been powered so that any solidified liquid metal between the member 20 and the body 10 is melted. To remove melted liquid metal, the scraper 41 can be operated through rod 42 whilst the member 20 is rotated through 180° clockwise and anti-clockwise.

FIG. 2 shows detail of the disposition of scraper 41, channels 40, and transfer port 22 in the rotary member 20. As can be seen in FIG. 2, the recess 9 has two sides as seen axially, including lower edge 9a.

The engagement of the sleeve in the recess with seals 31 between flat cooperating surfaces makes for a secure seal, particularly in comparison with seals obtained by simply pressing a shaped sealing ring against a curved plug surface. Because the seals 31 are retracted from the member 20 they do not suffer rubbing during movement of the valve member 20.

We claim:

1. A rotary plug valve comprising a housing, a plug of cylindrical from rotatable in the housing, a recess in the outer surface of the plug, the recess providing a flat seat, a sleeve having a flat end, seal means carried by said flat end, means for moving the sleeve toward and away from the plug between a sealing position in which the seal means is in sealing engagement with the flat seat and a retracted position clear of the plug, said sleeve in said sealing position preventing rotation of the plug, and a rotary scraper rotatably mounted in the rotary plug for rotation relative to the rotary plug for scraping the surface of the housing between inlet and outlet ports in the housing.

2. A rotary plug valve comprising a housing, a plug of cylindrical form rotatable in the housing, a recess in the outer surface of the plug, the recess providing a flat seat, a sleeve having a flat end, seal means carried by said flat end, and means for moving the sleeve between a sealing position in which the seal means is in sealing engagement with the flat seat and a retracted position clear of the plug, the sleeve having pegs engaging vertical slots in a fixed member and inclined slots in a member rotatable on the axis of the sleeve.

* * * * *

UNITED STATES PATENT AND TRADEMARK OFFICE
CERTIFICATE OF CORRECTION

PATENT NO.  : 4,770,202
DATED       : September 13, 1988
INVENTOR(S) : WEBB, John and PARR, David R.

It is certified that error appears in the above—identified patent and that said Letters Patent is hereby corrected as shown below:

On the front page of the printed patent (the information page, the name of the assignee is corrected as follows:

-- [73] Assignee:  United Kingdom Atomic Energy Authority, London, England--

Signed and Sealed this

Seventh Day of March, 1989

Attest:

DONALD J. QUIGG

Attesting Officer

Commissioner of Patents and Trademarks